(12) United States Patent
Toda et al.

(10) Patent No.: US 11,738,809 B2
(45) Date of Patent: Aug. 29, 2023

(54) VEHICLE BODY STRUCTURE

(71) Applicant: MAZDA MOTOR CORPORATION, Hiroshima (JP)

(72) Inventors: Isao Toda, Hiroshima (JP); Takayuki Kimura, Hiroshima (JP); Takehiro Kamei, Hiroshima (JP); Hiroshi Tanaka, Hiroshima (JP); Haruo Ohe, Hiroshima (JP); Masaya Hiramatsu, Hiroshima (JP); Masanobu Fukushima, Hiroshima (JP); Takao Fukuda, Hiroshima (JP); Hironobu Hashiguchi, Hiroshima (JP); Hiroyuki Baba, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 99 days.

(21) Appl. No.: 17/649,007

(22) Filed: Jan. 26, 2022

(65) Prior Publication Data
US 2022/0315128 A1 Oct. 6, 2022

(30) Foreign Application Priority Data
Mar. 30, 2021 (JP) ................. 2021-057815

(51) Int. Cl.
B62D 25/20 (2006.01)
B60N 2/005 (2006.01)

(52) U.S. Cl.
CPC ............. B62D 25/20 (2013.01); B60N 2/005 (2013.01)

(58) Field of Classification Search
CPC .... B62D 25/20; B62D 25/2036; B60N 2/005; B60N 2/06; B60N 3/06; B60N 2/07
USPC ......................................... 296/63
See application file for complete search history.

(56) References Cited

U.S. PATENT DOCUMENTS

2011/0233967 A1* 9/2011 Ohtsubo ............... B62D 25/20
296/193.07
2017/0341482 A1* 11/2017 Takezawa ........... H01M 10/613

FOREIGN PATENT DOCUMENTS

EP          2298613 A1 *  3/2011  .......... B60N 2/0252
JP     2005-178581 A      7/2005
JP     2008-260349 A     10/2008

* cited by examiner

Primary Examiner — Pinel E Romain
(74) Attorney, Agent, or Firm — Studebaker & Brackett PC

(57) ABSTRACT

The vehicle body structure includes a front floor panel, a rear floor panel positioned lower than the front floor panel, and a connection panel extending from a rear portion of the front floor panel to a front portion of the rear floor panel and inclined or curved so as to be positioned downward toward a rear side. At least the front portion of the connection panel is positioned at the front of the front portion of the front seat.

19 Claims, 5 Drawing Sheets

FRONT ←——→ REAR

FRONT ←——→ REAR

FRONT ⟷ REAR

VEHICLE BODY STRUCTURE

CROSS-REFERENCE TO RELATED APPLICATION

This application claims priority to Japanese Patent Application No. 2021-057815 filed on Mar. 30, 2021, the entire disclosure of which is incorporated by reference herein.

BACKGROUND

The present disclosure relates to a vehicle body structure including a floor panel, for example.

In a motor vehicle having a rear seat, a front seat is attached to a front portion of a floor panel, and the rear seat is attached to a rear portion of the floor panel positioned away rearward from the front seat (e.g. see Japanese Unexamined Patent Publication No. 2005-178581).

A vehicle body structure of Japanese Unexamined Patent Publication No. 2005-178581 includes a floor position adjuster capable of adjusting the height of a floor on which a leg of an occupant operating a pedal is placed. Japanese Unexamined Patent Publication No. 2005-178581 describes that, in general, the occupant is in an ergonomically comfortable state in a posture with a wide angle between an upper leg from the pelvis to a knee and a lower leg from a knee to an ankle when the seating position of the occupant is low. The floor position adjuster is provided to optimize this angle.

SUMMARY

According to inventor's study on the posture of the occupant upon pedal operation, it has found that, by raising a heel of the occupant operating the pedal to a position higher than a general position and lowering the hip point of the occupant, an angle between the lower leg and the floor becomes small and the pedal operability is improved accordingly. That is, the pedal operation in a vehicle is the operation of pushing the pedal forward of the vehicle, and at this point, the heel is placed on the floor in most cases. Thus, counterforce from the pedal acts on a foot sole, and counterforce from the floor mainly acts on the heel. In general, a pedal operation direction is not the horizontal direction but an obliquely-downward direction, and the small angle between the lower leg and the floor during the pedal operation results in small up-down component force input from the heel. This allows, e.g., the quick and accurate operation of switching the pedal to be stepped on from an accelerator pedal to a brake pedal or from the brake pedal to the accelerator pedal. As a result, the operability of the pedals is improved.

An approach for raising the position of the heel of the occupant operating the pedal is to provide the floor position adjuster of Japanese Unexamined Patent Publication No. 2005-178581. However, for providing such a floor position adjuster of Japanese Unexamined Patent Publication No. 2005-178581, there is a need for incorporating, in a vehicle body, a lifting/lowering mechanism for lifting/lowering the floor, a lock mechanism for locking the floor at a desired height, etc. In some vehicles, it is difficult to ensure spaces for these mechanisms.

Further, there is a demand for improvement in boarding/alighting of the occupant seated on or to be seated on the front seat. To address this need, for example, there is a power seat having the function of automatically sliding the seat rearward when ignition is OFF or when a seatbelt is unfastened so as to ensure a wide space for boarding/alighting.

However, the sliding speed of such a power seat is not fast. Particularly, when a sliding amount is increased to achieve better boarding/alighting, the occupant has to wait for the seat to move rearward, which inhibits smooth boarding/alighting.

In view of the foregoing background, it is an object of the present disclosure to improve pedal operability for an occupant operating a pedal while achieving better boarding/alighting.

To achieve the above-described object, a first aspect of the present disclosure may premise a vehicle body structure including a floor panel on which a front seat having a slide mechanism is provided. The vehicle body structure includes a front floor panel on which a heel of a pedal operator operating a pedal provided in the vehicle is placed, a rear floor panel provided at a rear of the front floor panel at a position lower than the front floor panel, and a connection panel extending from a rear portion of the front floor panel to a front portion of the rear floor panel, the connection panel being at least partially inclined or curved so as to be positioned downward toward a rear side. At least a vehicle front portion of the connection panel is positioned at the front of a front portion of the front seat.

According to this structure, the front floor panel for placing the heel of the pedal operator is positioned higher than the rear floor panel. Thus, the heel of the pedal operator is placed at a high position. This results in a small angle between a lower leg of the pedal operator and the front floor panel, which leads to small up-down component force input from a heel upon pedal operation. Thus, pedal operability is improved.

At least the front portion of the connection panel between the front floor panel and the rear floor panel is positioned at the front of the front portion of the front seat. Thus, the occupant seated on the front seat can put one's foot on the connection panel upon boarding/alighting. By unlocking the front seat and applying force to stretch a leg in this state, counterforce causes the front seat to slide rearward. At this point, since at least part of the connection panel is formed so as to be positioned downward toward the rear side, the foot is less likely to slip forward even if force is applied to stretch the leg and the front seat can reliably slide rearward quicker than a typical power seat. Further, a sliding amount of the front seat can be increased. Thus, the occupant on the front seat can easily get off the vehicle. Further, since the front seat is also slid rearward upon boarding, the occupant can easily get on the vehicle.

In a second aspect of the present disclosure, at least the front portion of the connection panel is positioned at the front of the front portion of the front seat while the front seat is in the state of having been slid to the foremost position by the slide mechanism.

That is, for example, in a case where the occupant is small, the front seat is expected to be slid to the foremost position. Even in the state in which the front seat has been slid to the foremost position, the front portion of the connection panel is positioned at the front of the front portion of the front seat, and therefore, even the small occupant can easily slide the front seat rearward by placing one's foot on the connection panel and applying force to stretch one's leg.

A third aspect of the present disclosure includes a pair of right and left hinge pillars arranged to extend in an up-down direction at both end portions of the front floor panel in a vehicle width direction. The front portion of the connection panel is positioned at the front of rear portions of the hinge pillars as viewed from the side of a vehicle body.

According to this structure, since a side door is supported to open/close about the hinge pillar, a front portion of a door opening at the side is formed by a rear portion of the hinge pillar. By arranging the front portion of the connection panel corresponding to the front portion of the door opening, a space below the foot can be enlarged corresponding to the door opening, and boarding/alighting can be further improved.

A fourth aspect of the present disclosure includes a pair of right and left side sills arranged to extend in a front-rear direction at both end portions of the floor panel in the vehicle width direction. An upper surface of the front floor panel is positioned higher than upper portions of the side sills.

According to this configuration, the front floor panel is positioned relatively high. This can achieve a sufficiently-small angle between the lower leg of the pedal operator and the front floor panel.

In a fifth aspect of the present disclosure, the rear floor panel includes a rear seat fixing portion for fixing a rear portion of the slide mechanism.

According to this configuration, since the rear portion of the slide mechanism is fixed to the rear floor panel, the hip point of the pedal operator seated on the front seat can be lowered.

In a sixth aspect of the present disclosure, the rear floor panel includes a front seat fixing portion for fixing a front portion of the slide mechanism.

According to this structure, since both the front and rear portions of the slide mechanism are fixed to the rear floor panel, the hip point of the pedal operator seated on the front seat can be further lowered.

In a seventh aspect of the present disclosure, the slide mechanism is configured to perform manual unlocking.

According to this configuration, when the occupant manually unlocks the front seat and stretches one's leg on the connection panel, the front seat can be moved rearward to a desired position. Since the front seat can be then locked at the rearwardly-moved position, the occupant can easily get on the vehicle.

An eighth aspect of the present disclosure may premise a vehicle body structure including a floor panel on which a front seat having a slide mechanism is provided. The floor panel includes a front panel portion for placing a heel of a pedal operator operating a pedal provided in the vehicle, a rear panel portion provided at the rear of the front panel portion at a position lower than the front panel portion, and a connection panel portion extending from a rear portion of the front panel portion to a front portion of the rear panel portion, the connection panel portion being inclined or curved so as to be positioned downward toward a rear side. At least a front portion of the connection panel portion is positioned at the front of a front portion of the front seat.

According to this configuration, one configured such that the floor panel is integrally formed from the front portion to the rear portion can provide features and advantages similar to those of the first aspect.

As described above, the pedal operability can be improved by the small angle between the lower leg of the pedal operator and the front floor panel, and boarding/alighting can be improved by providing, in the vicinity of the foot of the occupant, the connection panel that is inclined or curved so as to be positioned downward toward the rear side.

DETAILED DESCRIPTION

An embodiment of the present disclosure will be described in detail below with reference to the drawings. Note that the following description of the preferred embodiment is only an example in nature, and is not intended to limit the scope, applications or use of the present disclosure.

Figure 1:
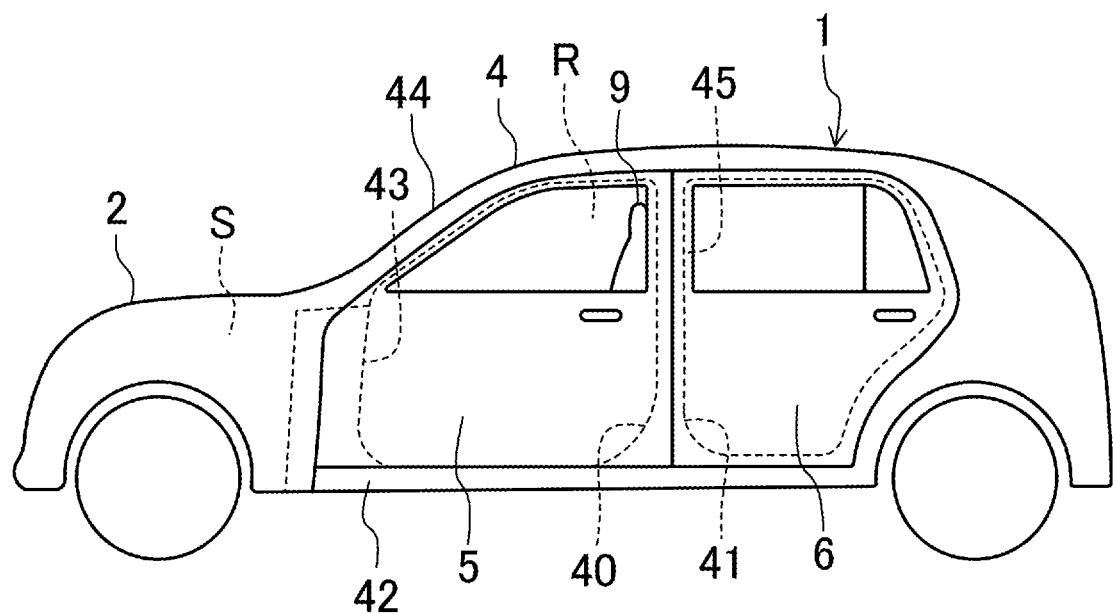
FIG. 1 is a side view of a motor vehicle of an embodiment of the present disclosure.

FIG. 1 is a left side view of a motor vehicle 1 of an embodiment of the present disclosure. The motor vehicle 1 is a so-called passenger car. Note that in the description of this embodiment, the front side of the vehicle is simply referred to as "front," the rear side of the vehicle is simply referred to as "rear," the right side of the vehicle is simply referred to as "right," and the left side of the vehicle is simply referred to as "left." A right-left direction of the vehicle is a vehicle width direction.

In a front portion of the motor vehicle 1, a power house S is provided. In the power house S, a power train (not shown) including an internal combustion engine, a traction motor, etc. is stored. Thus, the power house S can also be referred to as, e.g., a power train storage compartment, an engine room, or a motor room. Provided above the power house S is a hood 2. The motor vehicle 1 may be such a front-engine rear-drive vehicle (hereinafter referred to as an FR vehicle) that an engine, a traction motor, etc. mounted in a power house S drives rear wheels, or such a front-engine front-drive vehicle (hereinafter referred to as an FF vehicle) that an engine, a traction motor, etc. mounted in a power house S drives front wheels. In addition to the FR vehicle and FF vehicle, the motor vehicle may also be a 4-wheel drive vehicle configured such that an engine mounted in a power house S drives four wheels.

Figure 2:
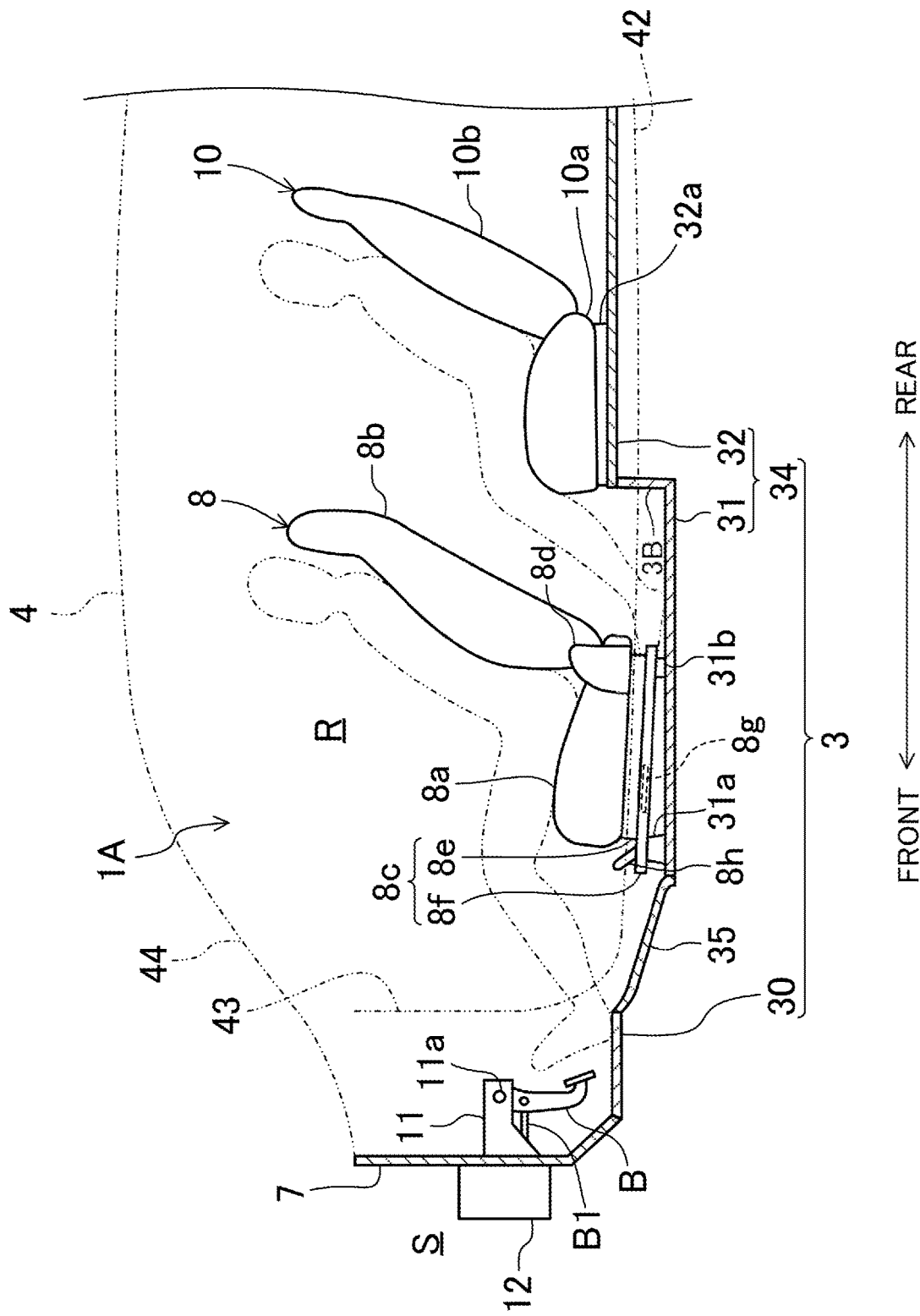
FIG. 2 is a partial cross-sectional view of a dash panel and a floor panel of the motor vehicle, FIG. 2 showing the position of a brake pedal.

In the motor vehicle 1, a vehicle interior R is provided at the rear of the power house S, as shown in FIG. 2. A bottom surface of the vehicle interior R is formed by a floor panel 3, and therefore, a space above the floor panel 3 is the vehicle interior R. A roof 4 is provided above the vehicle interior R. Further, as shown in FIG. 1, a front door 5 and a rear door 6 are arranged in an openable/closable manner at a left portion of the motor vehicle 1. Note that a front door and a rear door are also arranged in an openable/closable manner on the right side of the motor vehicle 1, although not shown in the figure.

As shown in FIG. 2, the motor vehicle 1 has a vehicle body structure 1A of the present disclosure. Although the vehicle body structure 1A includes the floor panel 3 and a dash panel 7, the dash panel 7 may be a member not forming the vehicle body structure 1A of the present disclosure. A member dividing the vehicle interior R and the power house S from each other in the front-rear direction is the dash panel 7. The dash panel 7 is made of, e.g., a steel plate, and extends not only in the right-left direction but also in the up-down direction. A lower portion of the dash panel 7 is inclined or curved so as to be positioned rearward toward a lower end portion thereof, and a lower end portion of the dash panel 7 is connected to a front end portion of the floor panel 3. Thus, the floor panel 3 is provided so as to extend rearward from the lower end portion of the dash panel 7.

In this embodiment, the right side of the vehicle interior R is a driver seat side, and the left side of the vehicle interior R is a passenger seat side. FIG. 2 is a cross-sectional view of the driver seat side of the motor vehicle 1, and shows the cross sections of the floor panel 3 and the dash panel 7 and a schematic structure of a driver seat 8 and a rear seat 10 attached to the floor panel 3 as well as a brake pedal B attached to the dash panel 7. While the driver seat 8 is provided on the right side of a center portion of the vehicle interior R in the right-left direction, a passenger seat 9 (shown in FIG. 1) is provided on the left side of the center portion of the vehicle interior R in the right-left direction. Note that the present disclosure is not limited to above, and the driver seat side may be on the left side of the vehicle interior R and the passenger seat side may be on the right side of the vehicle interior R. Further, there may be two or more rows of rear seats in the vehicle interior R.

The vehicle body structure 1A of the motor vehicle 1 will be described more specifically. As indicated by broken lines in FIG. 1, at each of the right and left portions of the motor vehicle 1, there are a front door opening 40 to be opened or closed by the front door 5 and a rear door opening 41 to be opened or closed by the rear door 6. As indicated by virtual lines in FIG. 2, the vehicle body structure 1A includes a pair of right and left side sills 42 (only the left one is shown) arranged to extend in the front-rear direction at both end portions of the floor panel 3 in the right-left direction. Further, the vehicle body structure 1A also includes a pair of right and left hinge pillars 43 (only the left one is shown) arranged to extend in the up-down direction at both end portions of a front floor panel 30 forming a front portion of the floor panel 3. A lower portion of the hinge pillar 43 is connected to the vicinity of a front portion of the side sill 42, and the hinge pillar 43 extends upward from such a portion. A lower portion of a front pillar 44 is connected to an upper portion of the hinge pillar 43. The front pillar 44 extends while being inclined so as to be positioned rearward toward the upper side, and is connected to a front portion of the roof 4. Further, the vehicle body structure 1A includes a center pillar 45 extending upward from the a middle portion of the side sill 42 in the front-rear direction. The front door opening 40 is formed by a rear edge portion of the hinge pillar 43, a lower edge portion of the front pillar 44, an upper edge portion of the side sill 42, a front edge portion of the center pillar 45, and the roof 4. The front door 5 is supported by the hinge pillar 43, and the rear door 6 is supported by the center pillar 45. Note that the rear door 6 may be omitted, and in this case, the rear door opening 41 is also omitted.

The brake pedal B is swingably provided at the dash panel 7. That is, in the vehicle interior R on the right side of the dash panel 7, a pedal bracket 11 is attached to a portion facing the driver seat 8. The pedal bracket 11 is provided away upward from an upper surface of the floor panel 3. A spindle 11a extending in the right-left direction is provided at the pedal bracket 11. An upper end portion of the brake pedal B is pivotably supported on the spindle 11a.

The brake pedal B extends downward from the portion supported by the spindle 11a. A lower end portion of the brake pedal B is a portion to be stepped on by an occupant. A rear end portion of a rod B1 is coupled to the brake pedal B. A front end portion of the rod B1 is connected to an input of a brake booster apparatus 12. Note that the front end portion of the rod B1 may be coupled to a brake force generation apparatus other than the brake booster apparatus 12.

Note that the support structure of the brake pedal B is not limited to one described above and the brake pedal B may be a so-called organ pedal type brake pedal although not shown in the figure. In this case, a lower portion of the brake pedal is swingably supported on the floor panel 3 through a spindle extending in the right-left direction.

Figure 3:
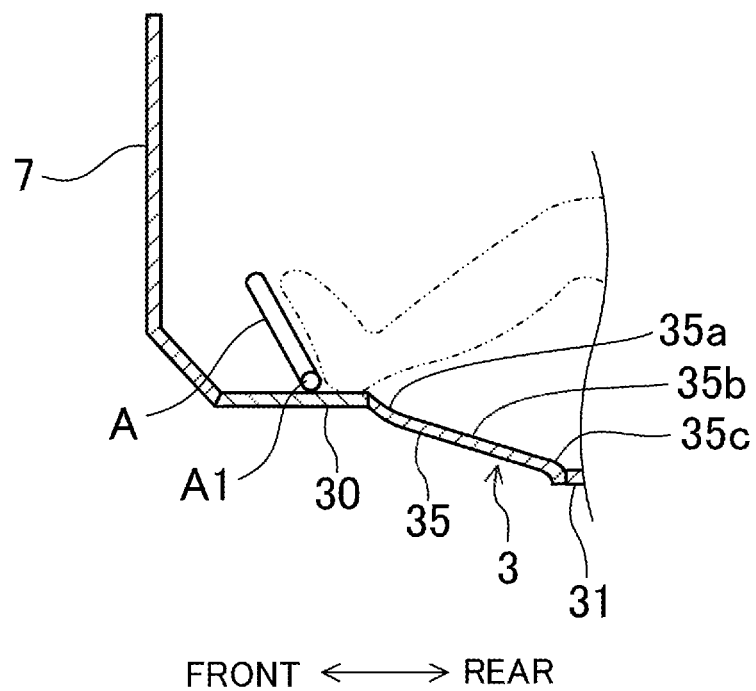
FIG. 3 is a partial cross-sectional view of the dash panel and the floor panel of the motor vehicle, FIG. 3 showing the position of an accelerator pedal.

FIG. 3 is a cross-sectional view of the dash panel 7 and the floor panel 3, and shows the position of an accelerator pedal A. The accelerator pedal A is of a so-called organ pedal type, and a lower portion of the accelerator pedal A is swingably supported to the floor panel 3 through a spindle A1 extending in the right-left direction. Note that although not shown in the figure, the accelerator pedal A may be of a hanging type. In this case, an upper portion of the accelerator pedal A is swingably supported on the dash panel 7 via the spindle extending in the right-left direction. The motor vehicle 1 driven by the traction motor also includes a pedal to be operated upon acceleration, and such a pedal will be also referred to as an accelerator pedal in the present specification.

Although not shown in the figure, in a case where a manual transmission, whose gear ratio is changed by an occupant using an operation lever (not shown) provided in the vehicle interior R, is mounted, a pedal for operating a clutch is provided in the vehicle interior R. Normally, the accelerator pedal A is arranged at the rightmost position, the brake pedal B is arranged at the left of the accelerator pedal A, and a clutch pedal is arranged at the left of the brake pedal B.

Further, for example, in an instruction vehicle used for a motor vehicle driving course, an accelerator pedal and a brake pedal are also provided on a passenger seat side as in a driver seat side, although not shown in the figure. The present disclosure is also applicable to such an instruction vehicle.

(Configuration of Floor Panel)

Figure 4:
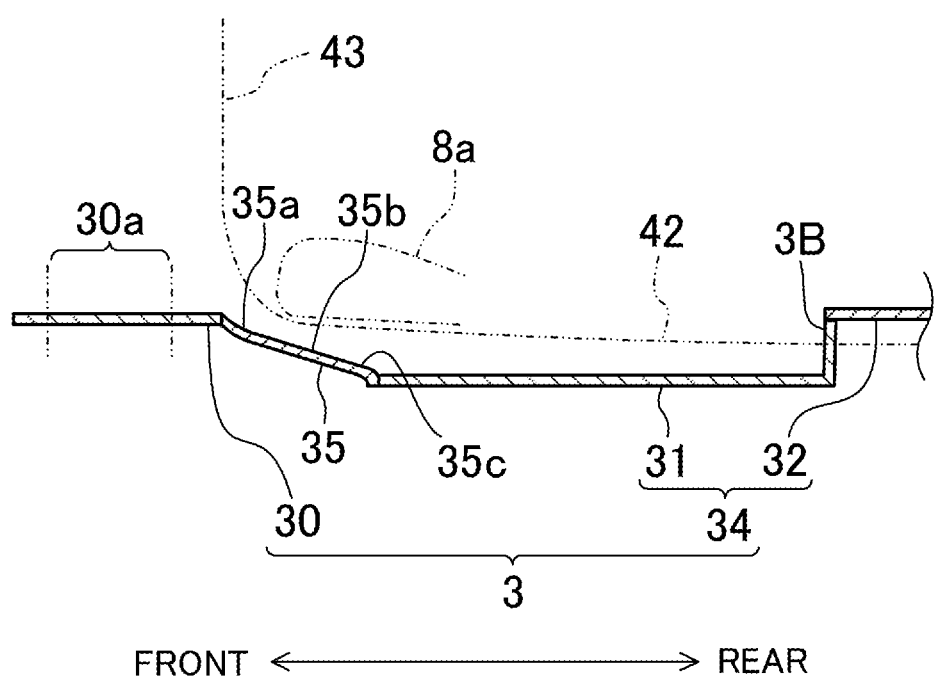
FIG. 4 is a cross-sectional view showing an exemplary structure of the floor panel.

As shown in FIG. 4, the floor panel 3 includes the front floor panel 30, a seat-mounted floor panel 34, and a connection panel 35 (details will be described later). The front floor panel 30, the seat-mounted floor panel 34, and the connection panel 35 are formed by separate members, and are joined to each other to form the single floor panel 3. Further, the seat-mounted floor panel 34 includes a first floor panel (a rear floor panel) 31 forming a front portion of the seat-mounted floor panel 34 and a second floor panel 32 forming a rear portion of the seat-mounted floor panel 34. The first floor panel 31 and the second floor panel 32 are separate members, and are joined to each other to form the seat-mounted floor panel 34.

Although not shown in the figure, a floor tunnel portion may be formed at the front floor panel 30, the connection panel 35, and the first floor panel 31. The floor tunnel portion can be formed in such a manner that center portions of the front floor panel 30, the connection panel 35, and the first floor panel 31 in the right-left direction bulge upward, and for example, may be formed so as to continuously extend in the front-rear direction from a front portion of the front floor panel 30 to a rear portion of the first floor panel 31.

The front floor panel 30 extends rearward from the lower end portion of the dash panel 7, and extends in the right-left direction. A heel rest portion 30a on which a heel of the pedal operator operating the brake pedal B and the accelerator pedal A is placed is provided at the front floor panel 30. The heel rest portion 30a is a portion where the heel of the occupant is naturally placed when the occupant operates the accelerator pedal A or the brake pedal B. This portion varies to some extent according to the physique, driving postures, etc. of the occupant, but is generally an area (region) shown in FIG. 4. That is, the heel rest portion 30a can be defined as a continuous region from a portion away rearward from a front end portion of the front floor panel 30 to a portion away forward from a rear end portion of the front floor panel 30, and can also be a middle portion of the front floor panel 30 in the front-rear direction.

In FIG. 4, the upper edge portion of the side sill 42 is indicated by a virtual line. An upper surface of the front floor panel 30 is positioned higher than the upper edge portion (upper portion) of the side sill 42. With this configuration, the height of the front floor panel 30 can be raised.

As shown in FIG. 2, the second floor panel 32 is a member provided away rearward from the front floor panel 30 and attached to the rear seat 10. The rear seat 10 includes a rear-seat cushion portion 10a forming a seat surface and a rear-seat seat back portion 10b forming a back rest portion. The rear-seat cushion portion 10a is fixed to an upper surface of the second floor panel 32.

Although the second floor panel 32 is continuously formed at least from a portion corresponding to a front end portion to a portion corresponding to a rear end portion of the rear-seat cushion portion 10a, the second floor panel 32 may be further extended rearward beyond the rear end portion of the rear-seat cushion portion 10a. In this case, a rear seat of a second row or a luggage compartment for placing luggage can be provided at the rear of the rear seat 10.

The first floor panel 31 extends from a rear portion of the connection panel 35 to a front portion of the second floor panel 32. The first floor panel 31 is positioned lower than the front floor panel 30. For example, the front floor panel 30 may extend substantially horizontally in the front-rear direction, and the first floor panel 31 may also be in such a shape that the first floor panel 31 extends substantially horizontally in the front-rear direction.

Further, the second floor panel 32 may also be in such a shape that the second floor panel 32 extends substantially horizontally in the front-rear direction. The second floor panel 32 is positioned higher than the first floor panel 31. Thus, the floor panel 3 includes a rear plate portion 3B extending in the up-down direction from the front portion of the second floor panel 32 to the rear portion of the first floor panel 31. Since the second floor panel 32 and the first floor panel 31 are connected to each other through the rear plate portion 3B, a step is formed between the second floor panel 32 and the first floor panel 31.

With the above-described configuration, the first floor panel 31 is positioned one step lower than the front floor panel 30 and the second floor panel 32. A difference in a height between the first floor panel 31 and each of the front floor panel 30 and the second floor panel 32 may be set to 5 cm or more, 10 cm or more, or 15 cm or more, for example. The front floor panel 30 and the second floor panel 32 may be at the same height, or the front floor panel 30 may be lower or higher than the second floor panel 32. Further, the front floor panel 30, the first floor panel 31, and the second floor panel 32 are not necessarily precisely horizontal, and may be inclined so as to be positioned downward toward the rear side. Further, only part of the front floor panel 30, the first floor panel 31, and the second floor panel 32 may be inclined, and the remaining part may be substantially horizontal. Further, the second floor panel 32 may be at the same height as that of the first floor panel 31.

The rear plate portion 3B may be integrally molded with the second floor panel 32 or with the first floor panel 31. Alternatively, the rear plate portion 3B may be formed separately from these floor panels 31, 32. Further, the rear plate portion 3B may extend substantially vertically, or may be inclined or curved. For example, the rear plate portion 3B can be inclined or curved so as to be positioned forward toward the lower side.

As shown in FIG. 2, the first floor panel 31 includes a first front-seat fixing portion (front seat fixing portion) 31a and a second front-seat fixing portion (rear seat fixing portion) 31b for fixing the front seat 8. The first front-seat fixing portion 31a is provided at the front of a center portion of the first floor panel 31 in the front-rear direction, and for example, includes a member fixed to the first floor panel 31 and formed long in the right-left direction. Similarly, the second front-seat fixing portion 31b also includes a member formed long in the right-left direction, and is provided a predetermined distance away rearward from the first front-seat fixing portion 31a. The configurations of the first front-seat fixing portion 31a and the second front-seat fixing portion 31b are not limited to the members as described above, and may be members formed in various shapes by plate members etc. Note that in this embodiment, the first front-seat fixing portion 31a is formed so as to be higher than the second front-seat fixing portion 31b. However, the heights of the first front-seat fixing portion 31a and the second front-seat fixing portion 31b may be the same as each other.

A rear-seat fixing portion 32a for fixing the rear seat 10 is provided at least at a front portion of the second floor panel 32. The rear-seat fixing portion 32a may be configured similarly to or differently from the front-seat fixing portions 31a, 31b. In a case where the second floor panel 32 and the first floor panel 31 are arranged at the same height, the front seat 8 and the rear seat 10 can be arranged at the same height.

(Front Seat)

The front seat 8 includes a front-seat cushion portion 8a, a front-seat seat back portion 8b, and a seat slide mechanism 8c configured to adjust the position of the front-seat cushion portion 8a in the front-rear direction. The front-seat cushion portion 8a is a portion forming a seat surface for a front seat occupant, and although not shown in the figure, includes, e.g., a seat frame provided in the front-seat cushion portion 8a, a cushion material supported on the seat frame, and a cover material covering the cushion material. The front-seat seat back portion 8b is a portion forming a back rest portion for the front seat occupant, and although not shown in the figure, includes, e.g., a seat frame, a cushion material, and a cover material.

A lower portion of the front-seat seat back portion 8b is attached to a rear portion of the front-seat cushion portion 8a through a reclining mechanism 8d. The reclining mechanism 8d is typically well-known, and is a mechanism for fixing the front-seat seat back portion 8b at an optional inclination angle.

The seat slide mechanism 8c may be a typically well-known mechanism, and for example, includes a movable member 8e fixed to a lower portion of the front-seat cushion portion 8a and a rail 8f fixed to the first front-seat fixing portion 31a and the second front-seat fixing portion 31b on the first floor panel 31. The rail 8f is a member for guiding the front-seat cushion portion 8a in the front-rear direction, and extends in the front-rear direction. A front portion of the rail 8f is fixed to the first front-seat fixing portion 31a, and a rear portion of the rail 8f is fixed to the second front-seat fixing portion 31b. Since the first front-seat fixing portion 31a is higher than the second front-seat fixing portion 31b, the rail 8f is inclined so as to be positioned upward toward the front. The rail 8f may be substantially horizontal.

The movable member 8e is a member capable of moving relative to the rail 8f in the front-rear direction while being engaged with the rail 8f. The position of the movable member 8e with respect to the rail 8f in the front-rear direction can be an optional position within a predetermined range, and the movable member 8e can be locked to the rail 8f at such a position. Specifically, the seat slide mechanism 8c includes a lock mechanism 8g capable of switching the movable member 8e between a locked state in which the movable member 8e is locked to the rail 8f and an unlocked state in which the movable member 8e is slidable in the front-rear direction. The lock mechanism 8g is typically well-known and includes an operation lever 8h, and is configured so as to be unlocked by manual operation of the operation lever 8h by the occupant. For example, by upwardly operating the operation lever 8h which is constantly biased downward, the lock mechanism 8g is switched to the unlocked state. On the other hand, by releasing a hand from the operation lever 8h, the operation lever 8h moves downward and switches the lock mechanism 8g to the locked state. The range of adjustment of the front seat 8 in the front-rear direction, i.e., the foremost position and the rearmost position of the front seat 8 in the front-rear direction, can be set by the seat slide mechanism 8c.

The height of the seat slide mechanism 8c can be set according to the height of the first floor panel 31, the height of the first front-seat fixing portion 31a, and the height of the second front-seat fixing portion 31b. In this embodiment, the height of the seat slide mechanism 8c is set such that the front floor panel 30 is at a position higher than the seat slide mechanism 8c when compared with the front floor panel 30.

(Rear Seat)

The rear seat 10 includes the rear-seat cushion portion 10a and the rear-seat seat back portion 10b. The rear-seat cushion portion 10a and the rear-seat seat back portion 10b can be configured similarly to those in the front seat 8. The rear-seat cushion portion 10a is fixed to the rear-seat fixing portion 32a on the second floor panel 32. Note that the rear seat 10 may be also provided with a seat slide mechanism and a reclining mechanism similar to those of the front seat 8.

(Connection Panel)

As shown in FIG. 4, the connection panel 35 is a member that connects the front floor panel 30 and the first floor panel 31 with each other, and extends continuously from a rear portion of the front floor panel 30 to a front portion of the first floor panel 31. In this embodiment, since the front floor panel 30 is at a position higher than the first floor panel 31, the connection panel 35 connecting these panels is inclined or curved so as to be positioned downward toward the rear side. The connection panel 35 may be entirely inclined or curved, or at least part of the connection panel 35 in the front-rear direction may be inclined or curved.

At least the front portion of the connection panel 35 is positioned at the front of the front portion of the front seat 8. FIG. 4 indicates, by a virtual line, a front portion of the front-seat cushion portion 8a in a state in which the front seat 8 has slid to the foremost position by the seat slide mechanism 8c. The front portion of the connection panel 35 is positioned at the front of the front portion of the front-seat cushion portion 8a at this position, and therefore, is in such a positional relationship that the front portion and/or the middle portion of the connection panel 35 are visible at the front of the front-seat cushion portion 8a as viewed in plane.

Further, FIG. 4 indicates the rear edge portion of the hinge pillar 43 by a virtual line. As shown in FIG. 4, the front portion of the connection panel 35 is positioned at the front of a rear portion (the rear edge portion) of the hinge pillar 43 as viewed from the side of the vehicle body. That is, since the rear edge portion of the hinge pillar 43 is a portion to be a front edge portion of the front door opening 40 (shown by a broken line in FIG. 1), the front portion of the connection panel 35 is positioned at the front of the front edge portion of the front door opening 40.

The connection panel 35 may be a member that is inclined at the same inclination angle from the rear portion of the front floor panel 30 to the front portion of the first floor panel 31. Alternatively, the connection panel 35 may have a portion in the front-rear direction, the portion being inclined at an inclination angle different from that of other portions. Further, the connection panel 35 may be a member that is curved with the same curvature from the rear portion of the front floor panel 30 to the front portion of the first floor panel 31. Alternatively, the connection panel 35 may have a portion in the front-rear direction, the portion being curved with a curvature different from that of other portions. Further, a portion of the connection panel 35 in the front-rear direction may be inclined, and other portions may be curved. Only a portion of the connection panel 35 in the front-rear direction may be a horizontal portion that is substantially horizontal, or there may be a step at a portion of the connection panel 35 in the front-rear direction.

In the present embodiment, the connection panel 35 has such a structure that the connection panel 35 is dividable into three regions, i.e., a front region 35a, a middle region 35b, and a rear region 35c. The front region 35a is positioned at the front of the front portion of the front-seat cushion portion 8a having slid to the foremost position. The front region 35a is a region extending from the front edge portion to the middle portion of the connection panel 35 in the front-rear direction. The rear region 35c is a region extending from the rear edge portion to the middle portion of the connection panel 35 in the front-rear direction. The middle region 35b is a region extending from a rear edge portion of the front region 35a to a front edge portion of the rear region 35c. Note that the front region 35a may be omitted and the inclination of the middle region 35b may be extended to the front edge portion of the connection panel 35. Alternatively, the rear region 35c may be omitted and the inclination of the middle region 35b may be extended to the rear edge portion of the connection panel 35. Further, the connection panel 35 may be dividable into four or more regions.

The front region 35a is formed by a portion curved downward so as to be positioned downward toward the rear side, and forms a recessed portion at the rear of the front floor panel 30. The middle region 35b is formed by a portion inclined so as to be positioned downward toward the rear side. The rear region 35c is formed by a portion curved upward so as to be positioned downward toward the rear side, and forms a raised portion at the front of the first floor panel 31. The front region 35a and the middle region 35b are formed smoothly continuously to each other. Further, the middle region 35b and the rear region 35c are also formed smoothly continuously to each other. The middle region 35b may be curved. A recessed or raised portion may be formed at the middle portion of the connection panel 35 in the front-rear direction.

Although not shown in the figure, an anti-slip portion may be provided on the upper surface of the connection panel 35.

For example, the anti-slip portion may have a recessed-raised shape or may be a member having a high coefficient of friction, such as rubber.

(Posture of Front Seat Occupant and Pedal Operation)

Figure 5:
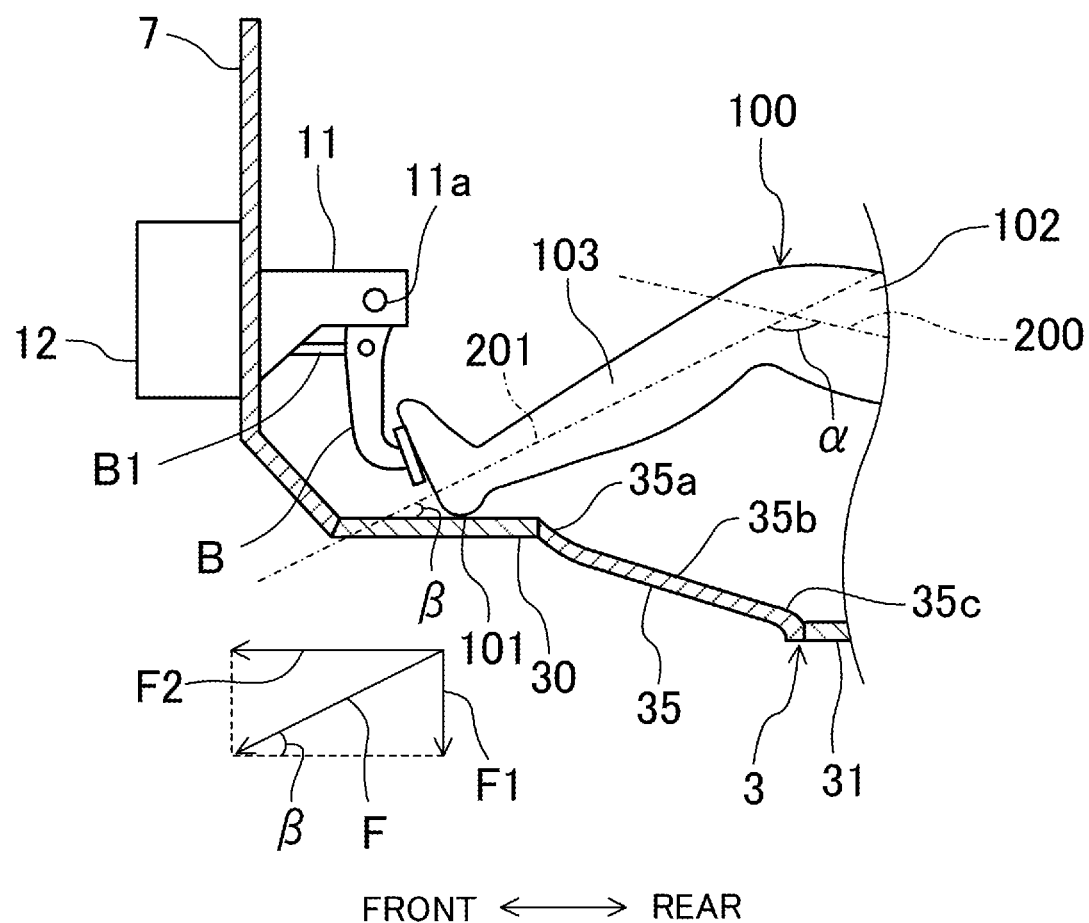
FIG. 5 is a view for describing pedal operation.

FIG. 5 is a view showing a lower limb 100 of the front seat occupant (a pedal operator) seated on the front seat 8, the floor panel 3, the dash panel 7, the brake pedal B, and the vicinity thereof. In this embodiment, the lower rear portion of the seat frame 8g of the front seat 8 is positioned lower than the upper surface of the front floor panel 30. Thus, the hip point of the pedal operator can be lowered. Lowering the hip point of the pedal operator means that the seating position of the pedal operator is lowered. This lowers the height of the center of gravity of the vehicle while the occupant is on-board.

Further, since the front floor panel 30 on which a heel 101 of the pedal operator is placed is positioned higher than the first floor panel 31, the heel 101 of the pedal operator is placed at a position higher as compared to a general operation posture. Such a layout leads to such a posture that an upper leg 102 and a lower leg 103 of the pedal operator are widely open. In FIG. 5, a reference numeral 200 indicates the center line of the upper leg 102 of the pedal operator whereas a reference numeral 201 indicates the center line of the lower leg 103, and a difference in a height between the front floor panel 30 and the first floor panel 31 is set such that an angle (an opening angle α between the upper leg 102 and the lower leg 103) between the center lines 200, 201 falls within a range of 125° to 150°.

Setting the height difference as described above results in a smaller angle (angle β between the center line 201 and the front floor panel 30) between the lower limb 100 and the front floor panel 30. This decreases component force, which is input to the heel 101 upon pedal operation, in the up-down direction, and improves the operability of the brake pedal B. More specifically, when the pedal operator steps on the brake pedal B, the heel 101 causes obliquely-downward force F to act on the front floor panel 30. When divided into vertical force and horizontal force, the force F is divided into force F1 and force F2. Since the angle β is small as described above, the component force F1, which is input from the heel 101, in the up-down direction is reduced. This allows, e.g., the quick and accurate operation of switching the pedal to be stepped on from the brake pedal B to the accelerator pedal A or from the accelerator pedal A to the brake pedal B. As a result, the operability of the pedals A, B is improved.

(Boarding/Alighting of Front Seat Occupant)

When the occupant seated on the front seat 8 gets off the vehicle, the occupant can easily get off the vehicle by sliding the front seat 8 rearward by the seat slide mechanism 8c. Further, when getting on the vehicle, the occupant can easily get on the vehicle by sliding the front seat 8 rearward in advance. Hereinafter, a case upon alighting will be specifically described.

Before alighting (upon driving), the position of the front seat 8 in the front-rear direction is a position according to, e.g., the physique of the occupant, so that the occupant can be in a predetermined driving posture as described above. In general, the front seat 8 is positioned at the front of its rearmost position. If the occupant is small, the front seat 8 is at the foremost position as indicated by a virtual line in FIG. 4 in some cases. Even when the front seat 8 is at the foremost position, the front portion of the connection panel 35 is positioned at the front of the front portion of the front-seat cushion portion 8a. Thus, the occupant only needs to bend one's leg to place at least the heel of one's foot on the connection panel 35.

By operating the operation lever 8h of the lock mechanism 8g of the front seat 8 upward for unlocking and applying force to stretch the leg while at least the heel of the foot is placed on the connection panel 35, the counterforce can cause the front seat 8 to slide rearward. At this point, since the connection panel 35 is formed so as to be positioned downward toward the rear side, the foot is less likely to slip forward even if force is applied to stretch the leg and the front seat 8 can reliably slide rearward quicker than a power seat. A rearward slide amount may vary according to an occupant, or the front seat 8 may be slid to the rearmost position or to a position immediately before the rearmost position.

By sliding the front seat 8 rearward, the front door opening 40 becomes widely usable at the side of the occupant, and the occupant on the driver seat side moves away from a steering wheel. Thus, the occupant can easily get off the vehicle. Note that the seat on the passenger seat side can be similarly slid rearward upon alighting.

Further, since the front portion of the connection panel 35 is positioned at the front of the rear portion of the hinge pillar 43 when viewed from the side of the vehicle body, the front portion of the connection panel 35 can be arranged corresponding to the front portion of the front door opening 40. As a result, a space below the foot can be enlarged corresponding to the front door opening 40, and boarding/alighting can be further improved.

Further, since the front region 35a of the connection panel 35 is in a recessed shape, the heel can be hooked on the front region 35a. Thus, when the leg is stretched, the heel is less likely to slip forward, and therefore, the front seat 8 can be easily slid rearward.

(Comfort of Rear Seat Occupant)

Note that this embodiment can improve the comfort of the rear seat occupant. As shown in FIG. 2, since the second floor panel 32 to which the rear seat 10 is attached is positioned higher than the first floor panel 31, the occupant on the rear seat 10 is seated at a relatively-high position, which improves the field of view. The feet of the rear seat occupant are placed on the first floor panel 31. Since the first floor panel 31 is positioned lower than the second floor panel 32, a wide foot space for the rear seat occupant is ensured particularly in the height direction.

Features and Advantages of Embodiment

As described above, according to this embodiment, the pedal operability can be improved by the small angle β between the lower leg 103 of the pedal operator and the front floor panel 30 while boarding/alighting is improved by providing, in the vicinity of the foot of the occupant, the connection panel 35 that is inclined or curved so as to be positioned downward toward the rear side.

Further, since the seat fixing portions 31a, 31b are provided on the first floor panel 31 positioned lower than the front floor panel 30, the hip point of the pedal operator seated on the front seat 8 is lowered. This can achieve a sufficiently-small angle β between the lower leg 103 of the pedal operator and the front floor panel 30.

Other Embodiments

The above-described embodiments are merely examples in nature in all respects, and the scope of the present disclosure should not be interpreted in a limited manner.

Further, variations and modifications of equivalents of the patent claims are intended to fall within the scope of the present disclosure.

Figure 6:
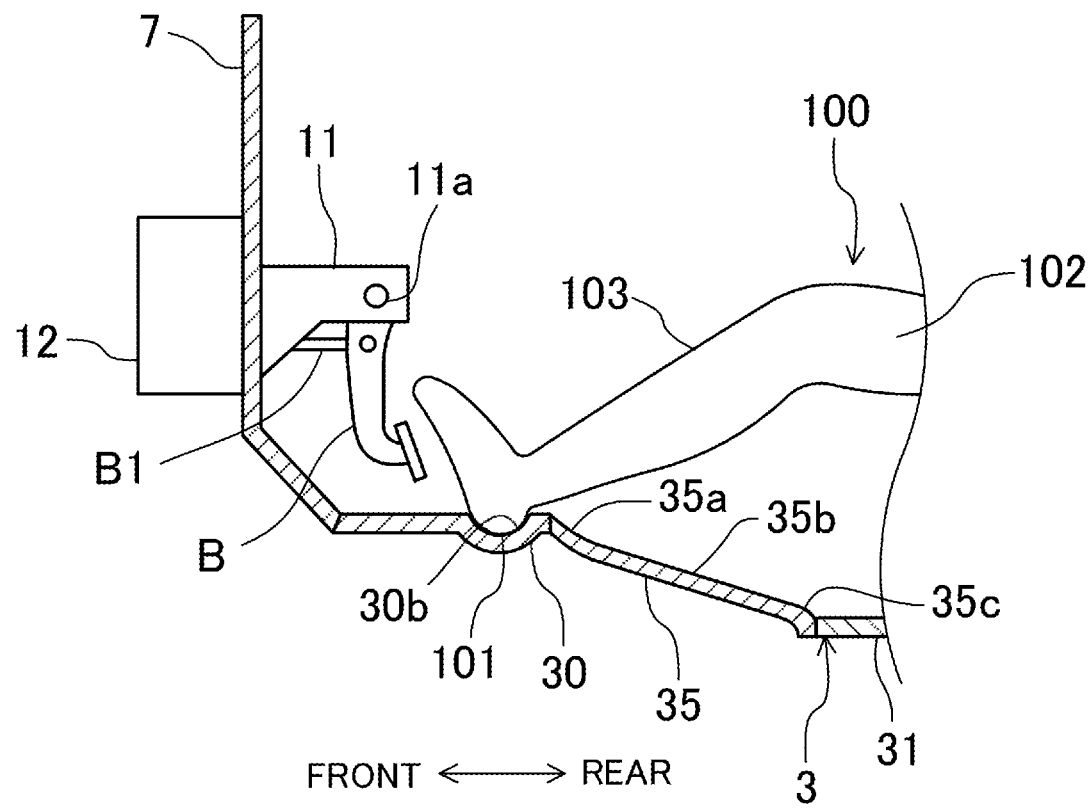
FIG. 6 is a view corresponding to FIG. 5, which relates to Variation 1 of the embodiment.

For example, in Variation 1 of the embodiment shown in FIG. 6, the front floor panel 30 has, at a portion corresponding to the brake pedal B, a recessed portion 30b for placing the heel 101 of the pedal operator. It may only be required that the depth of the recessed portion 30b is set so as to house at least part of a heel portion of a shoe, and the depth can be 2 cm or more or 3 cm or more, for example. Since the pedal operability might be degraded if the recessed portion 30b is extremely deep, the depth may be 7 cm or less, for example. The width (the dimension in the right-left direction) of the recessed portion 30b can be, for example, 5 cm or more or 7 cm or more.

With the recessed portion 30b, the heel 101 is less likely to shift in the right-left direction. This can make the foot stable in the case of turning a toe in the right-left direction about the vicinity of the heel 101, such as the case of stepping on the accelerator pedal A after having stepped on the brake pedal B, for example. As a result, the pedal operability can be further improved by a synergy effect with the above-described advantage of the small angle β between the lower leg 103 of the pedal operator and the front floor panel 30.

Figure 7:
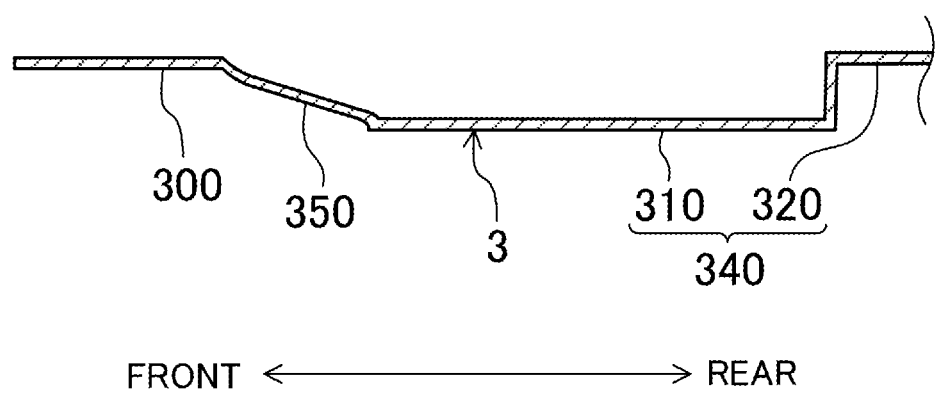
FIG. 7 is a view corresponding to FIG. 4, which relates to Variation 2 of the embodiment.

Further, as in, e.g., Variation 2 of the embodiment shown in FIG. 7, the floor panel 3 may be a single piece from the front portion to the rear portion. Specifically, the floor panel 3 of Variation 2 includes a front panel portion 300 on which the heel of the pedal operator is to be placed, a seat-mounted panel portion 340, and a connection panel portion 350. The seat-mounted panel portion 340 is provided at the rear of the front panel portion 300, and includes a first panel portion (rear panel portion) 310 to which at least the front seat 8 is attached and a second panel portion 320.

A front portion of the connection panel portion 350 is positioned at the front of the front portion of the front-seat cushion portion 8a having been slid to the foremost position. The front panel portion 300 is equivalent to the above-described front floor panel 30, the first panel portion 310 is equivalent to the above-described first floor panel 31, the second panel portion 320 is equivalent to the above-described second floor panel 32, and the connection panel portion 350 is equivalent to the above-described connection panel 35. In Variation 2, features and advantages similar to those of the above-described embodiment can be also obtained. Further, the front panel portion 300 and the connection panel portion 350 may be integrally formed, and the first panel portion 310 may be a separate member. Alternatively, the first panel portion 310 and the connection panel portion 350 may be integrally formed, and the front panel portion 300 may be a separate member.

As described above, the vehicle body structure of the present disclosure is applicable to a motor vehicle having a floor panel, for example.

What is claimed is:

1. A vehicle body structure having a floor panel on which a front seat having a slide mechanism is provided, comprising:
    a front floor panel on which a heel of a pedal operator operating a pedal provided in the vehicle is placed;
    a rear floor panel provided at a rear of the front floor panel at a position lower than the front floor panel; and
    a connection panel extending from a rear portion of the front floor panel to a front portion of the rear floor panel, the connection panel being at least partially inclined or curved so as to be positioned downward toward a rear side,
    at least a front portion of the connection panel being positioned at a front of a front portion of the front seat.

2. The vehicle body structure of claim 1, wherein
    at least the front portion of the connection panel is positioned at the front of the front portion of the front seat when the front seat is in a state of having been slid to a foremost position by the slide mechanism.

3. The vehicle body structure of claim 2, further comprising:
    a pair of right and left hinge pillars arranged to extend in an up-down direction at both end portions of the front floor panel in a vehicle width direction, wherein
    the front portion of the connection panel is positioned at the front of rear portions of the hinge pillars as viewed from a side of a vehicle body.

4. The vehicle body structure of claim 3, further comprising:
    a pair of right and left side sills arranged to extend in a front-rear direction at both end portions of the floor panel in the vehicle width direction, wherein
    an upper surface of the front floor panel is positioned higher than upper portions of the side sills.

5. The vehicle body structure of claim 4, wherein
    the rear floor panel includes a rear seat fixing portion for fixing a rear portion of the slide mechanism.

6. The vehicle body structure of claim 5, wherein
    the rear floor panel includes a front seat fixing portion for fixing a front portion of the slide mechanism.

7. The vehicle body structure of claim 6, wherein
    the slide mechanism is configured to perform manual unlocking.

8. A vehicle body structure comprising:
    a floor panel on which a front seat having a slide mechanism is provided,
    the floor panel including
    a front panel portion for placing a heel of a pedal operator operating a pedal provided in the vehicle,
    a rear panel portion provided at a rear of the front panel portion at a position lower than the front panel portion, and
    a connection panel portion extending from a rear portion of the front panel portion to a front portion of the rear panel portion, the connection panel portion being inclined or curved so as to be positioned downward toward a rear side,
    at least a front portion of the connection panel portion is positioned at a front of a front portion of the front seat.

9. The vehicle body structure of claim 1, further comprising:
    a pair of right and left hinge pillars arranged to extend in an up-down direction at both end portions of the front floor panel in a vehicle width direction, wherein
    the front portion of the connection panel is positioned at the front of rear portions of the hinge pillars as viewed from a side of a vehicle body.

10. The vehicle body structure of claim 1, further comprising:
    a pair of right and left side sills arranged to extend in a front-rear direction at both end portions of the floor panel in the vehicle width direction, wherein
    an upper surface of the front floor panel is positioned higher than upper portions of the side sills.

11. The vehicle body structure of claim 1, wherein
the rear floor panel includes a rear seat fixing portion for fixing a rear portion of the slide mechanism.

12. The vehicle body structure of claim 1, wherein
the slide mechanism is configured to perform manual unlocking.

13. The vehicle body structure of claim 2, further comprising:
a pair of right and left side sills arranged to extend in a front-rear direction at both end portions of the floor panel in the vehicle width direction, wherein
an upper surface of the front floor panel is positioned higher than upper portions of the side sills.

14. The vehicle body structure of claim 2, wherein
the rear floor panel includes a rear seat fixing portion for fixing a rear portion of the slide mechanism.

15. The vehicle body structure of claim 2, wherein
the slide mechanism is configured to perform manual unlocking.

16. The vehicle body structure of claim 3, wherein
the rear floor panel includes a rear seat fixing portion for fixing a rear portion of the slide mechanism.

17. The vehicle body structure of claim 3, wherein
the slide mechanism is configured to perform manual unlocking.

18. The vehicle body structure of claim 4, wherein
the slide mechanism is configured to perform manual unlocking.

19. The vehicle body structure of claim 5, wherein
the slide mechanism is configured to perform manual unlocking.

\* \* \* \* \*